US011888229B1

(12) United States Patent
Dressel

(10) Patent No.: US 11,888,229 B1
(45) Date of Patent: Jan. 30, 2024

(54) AXISYMMETRIC REFLECTOR ANTENNA FOR RADIATING AXISYMMETRIC MODES

(71) Applicant: Raytheon Company, Waltham, MA (US)

(72) Inventor: Earl M. Dressel, Albuquerque, NM (US)

(73) Assignee: Raytheon Company, Waltham, MA (US)

( * ) Notice: Subject to any disclaimer, the term of this patent is extended or adjusted under 35 U.S.C. 154(b) by 217 days.

(21) Appl. No.: 17/117,610

(22) Filed: Dec. 10, 2020

Related U.S. Application Data

(60) Provisional application No. 62/946,463, filed on Dec. 11, 2019, provisional application No. 62/946,458, filed on Dec. 11, 2019.

(51) Int. Cl.
*H01Q 19/19* (2006.01)

(52) U.S. Cl.
CPC ................................ *H01Q 19/193* (2013.01)

(58) Field of Classification Search
CPC .. H01Q 19/023; H01Q 19/193; H01Q 19/192; H01Q 15/28
See application file for complete search history.

(56) References Cited

U.S. PATENT DOCUMENTS

| | | | | |
|---|---|---|---|---|
| 3,858,221 | A * | 12/1974 | Harrison | H01Q 3/26 343/846 |
| 6,061,033 | A * | 5/2000 | Hulderman | H01Q 3/20 343/781 CA |
| 8,212,734 | B1 * | 7/2012 | Matyas | H01Q 19/18 343/781 P |
| 10,418,712 | B1 * | 9/2019 | Henderson | H01Q 19/134 |
| 10,749,266 | B2 * | 8/2020 | Mizzoni | H01Q 1/288 |
| 2004/0021612 | A1 * | 2/2004 | Louzir | H01Q 21/28 343/781 CA |
| 2006/0082513 | A1 * | 4/2006 | Kralovec | H01Q 13/0266 343/781 CA |
| 2015/0084820 | A1 * | 3/2015 | Ahn | H01Q 19/17 343/781 CA |
| 2019/0123450 | A1 * | 4/2019 | Thiagarajan | H01Q 3/2658 |
| 2021/0156953 | A1 * | 5/2021 | Rodenbeck | H01Q 1/27 |

* cited by examiner

*Primary Examiner* — Awat M Salih
(74) *Attorney, Agent, or Firm* — Daly, Crowley, Mofford & Durkee, LLP

(57) ABSTRACT

A reflector antenna system includes: a concave primary reflector, the concave primary reflector adapted to be illuminated by a sub-reflector and radiate accordingly an axisymmetric beam; a coherent-phase sub-reflector disposed one in front of the primary reflector; and a feed adapted to operate with the $TE_{01}$ axisymmetric mode and illuminating the said sub-reflector by employment of such. the aperture of the feed disposed to crowd the sub-reflector.

12 Claims, 8 Drawing Sheets

AXISYMMETRIC REFLECTOR ANTENNA FOR RADIATING AXISYMMETRIC MODES

CROSS-REFERENCE TO RELATED APPLICATIONS

This application claims priority from U.S. Provisional application Ser. No. 62/946,458 filed on Dec. 11, 2019 and from U.S. Provisional application Ser. No. 62/946,463 filed on Dec. 11, 2019, both of which are incorporated herein by reference.

STATEMENT REGARDING FEDERALLY SPONSORED RESEARCH

Not Applicable.

FIELD

This disclosure relates generally to radio frequency transmitting and receiving systems, and, more particularly, to a reflector antenna having an axisymmetric-mode feed to allow a sub reflector to crowd very close to a horn feed and, still more particularly, to a Cassegrain reflector antenna having an axisymmetric-mode feed to allow the Cassegrain sub reflector to crowd very close to the horn feed or alternatively a Gregorian reflector antenna having an axisymmetric-mode feed to allow the Gregorian sub reflector to crowd very close to the horn feed.

BACKGROUND

It is desirable for a high power radio frequency transmitter operating at a microwave frequency to provide a high power microwave (HPM) signal. In an HPM system based on a high-power radio-frequency (RF) source, electromagnetic radiation is extracted from the RF source using waveguide. Extraction from typical current state of the art HPM RF sources employs an axisymmetric waveguide mode, such as the $TM_{01}$, $TE_{01}$, or TEM circular waveguide modes. The two ways that these HPM systems attempt to harness the extracted axisymmetric circular waveguide mode are by 1) either converting the axisymmetric mode in circular waveguide to either the $TE_{11}$ circular waveguide mode or the $TE_{10}$ rectangular waveguide mode in order for the extracted HPM energy to interface with a typical reflector antenna system that will transmit the HPM energy by employing a pencil beam reflector antenna application. or 2) resorting to specialized radiators with typically limited applicability.

The mentioned mode conversion from an axisymmetric circular waveguide mode is required since the illumination of a typical pencil beam reflector antenna with the axisymmetric mode from a circular waveguide feed results in a null in the center of the reflector antenna aperture, which is not suited for generating a pencil beam. It is therefore desirable to provide an application that results in good pencil beam reflector antenna illumination and performance with a more direct utilization of an axisymmetric circular waveguide mode.

SUMMARY

The present disclosure teaches a reflector antenna including: a concave primary reflector, the concave primary reflector adapted to reflect an axisymmetric aperture electromagnetic field distribution, as illuminated by a coherent-phase subreflector, in turn illuminated by a $TE_{01}$ or $TM_{01}$ mode feed; a coherent-phase sub-reflector disposed one in front of the primary reflector, adapted to reflect a coherently phased axisymmetric electromagnetic wave to appropriately illuminate the aforementioned primary reflector, as in turn illuminated by a reflector feed operating with the $TE_{01}$ or $TM_{01}$ axisymmetric circular waveguide mode; and a feed operating with the $TE_{01}$ or $TM_{01}$ axisymmetric mode and adapted to appropriately illuminate said coherent-phase subreflector, while crowded atypically close to said coherent-phase subreflector.

The present disclosure teaches a reflector pair antenna system utilizing a Cassegrain subreflector comprising: a concave primary reflector, the concave primary reflector adapted to reflect an axisymmetric aperture electromagnetic field distribution; a coherent-phase Cassegrain sub-reflector disposed in front of the primary reflector; and a feed operating with the $TE_{01}$ or $TM_{01}$ axisymmetric mode and adapted to appropriately illuminate the Cassegrain subreflector, while crowded atypically close to said Cassegrain subreflector.

The present disclosure also teaches a reflector pair antenna system utilizing a Gregorian subreflector comprising: a concave primary reflector, the concave primary reflector adapted to reflect an axisymmetric aperture electromagnetic field distribution; a coherent-phase Gregorian subreflector disposed in front of the primary reflector; and a feed operating with the $TE_{01}$ or $TM_{01}$ axisymmetric mode and adapted to appropriately illuminate the Gregorian subreflector, while crowded atypically close to said Gregorian subreflector.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
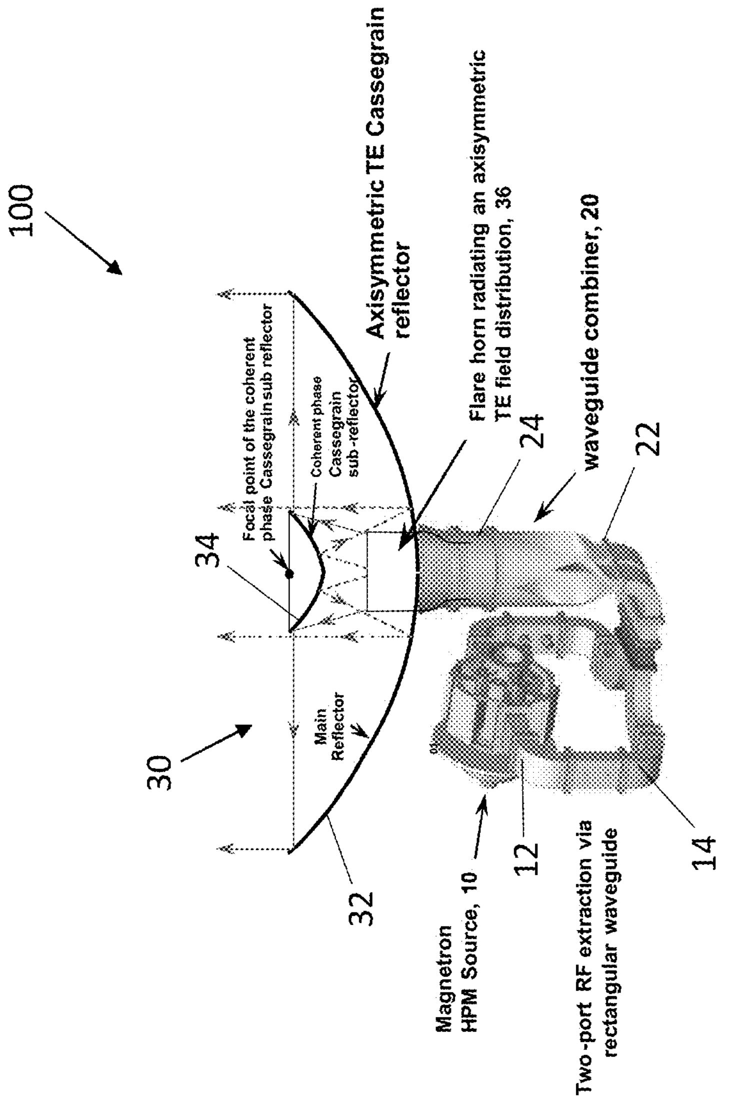
FIG. 1 shows a high power microwave system with an axisymmetric Cassegrain reflector pair antenna.

The features and other details of the disclosure will now be more particularly described. It will be understood that any specific embodiments described herein are shown by way of illustration and not as limitations of the concepts, systems and techniques described herein. The principal features of this disclosure can be employed in various embodiments without departing from the scope of the concepts sought to be protected.

The disclosure relates to methods and apparatus for an axisymmetric Cassegrain pair of reflectors composed of 1) a $TE_{01}$ or $TM_{01}$ mode feed-illuminated convex sub reflector that in turn illuminates, 2) a larger concave main reflector. This assembly transforms a feed-radiated $TE_{01}$ circular or $TM_{01}$ circular axisymmetric waveguide mode into a collimated beam from the concave main reflector that retains the axisymmetric character of the feed modes in the main reflector aperture distribution. The reflecting surface of the sub reflector is shaped by design to render a phase coherent illumination of the main reflector with a collocated focal point for the sub reflector and main reflector. The embodiment can handle extremely high power, making it suitable for high-power microwave (HPM) applications. It stands to reason that the embodiment can also be utilized in low power electromagnetic systems, both transmit and receive where a collimated beam with an aperture axisymmetric modal characteristic is of use.

The disclosure also relates to methods and apparatus for an axisymmetric Gregorian pair of reflectors composed of 1) a $TE_{01}$ or $TM_{01}$ mode feed-illuminated convex sub reflector that in turn illuminates, 2) a larger concave main reflector. This assembly transforms a feed-radiated $TE_{01}$ circular or $TM_{01}$ circular axisymmetric waveguide mode into a collimated beam from the concave main reflector that retains the axisymmetric character of the feed modes in the main reflector aperture distribution. The reflecting surface of the sub reflector is shaped by design to render a phase coherent illumination of the main reflector with a collocated focal point for the sub reflector and main reflector. The embodiment can handle extremely high power, making it suitable for high-power microwave (HPM) applications. It stands to reason that the embodiment can also be utilized in low power electromagnetic systems, both transmit and receive where a collimated beam with an aperture axisymmetric modal characteristic is of use.

In an ordinary axisymmetric (i.e., not offset) Cassegrain reflector antenna system, an elliptically-polarized feed (for example a horn or other type of feed) (linear or circular polarization) radiates a cosine or quasi-Gaussian electromagnetic (EM) aperture field distribution with maximum power density on the symmetry axis. This sub reflector illuminating field distribution with the maximum on symmetry axis, results in a significant portion of the radiated power being reflected from the sub reflector back into the feed, resulting in challenging return loss performance of the antenna system. This becomes especially challenging when the antenna system is employed in a high power application and/or when mechanical constraints require a crowded feed-sub-reflector topology.

In contrast, an axisymmetric Cassegrain reflector antenna system utilizing a feed radiating $TE_{01}$ or $TM_{01}$ axisymmetric aperture modes, has a power density null on the symmetry axis, with the power-density distribution forming an annulus around the symmetry axis that has a maximum at a cylindrical radius removed from the symmetry axis. The power-density distribution decreases monotonically with radius beyond the maximum. This annular modal power distribution results in the sub reflector reflecting less power back into the feed, as compared to the typical cosine or quasi-Gaussian type distributions. The reflected power is distributed radially outward to larger polar angles. On the aperture of the main reflector the power-density distribution as illuminated by the sub reflector forms a broad annulus covering most of the area of the aperture and tapering more rapidly than a cosine or quasi-Gaussian type distribution, rendering lower than typical edge illumination of the main reflector.

The null on the symmetry axis radiated by an axisymmetric-mode feed allows the Cassegrain sub reflector to crowd very close to the feed without imposing significant return loss, thereby substantially reducing the minimum axial length of the Cassegrain reflector antenna system, compared to a typical Cassegrain reflector antenna system fed by a cosine or quasi-Gaussian distribution mode feed. This allows crowding of the feed to sub reflector, resulting in better compact topology options. The enabled axial size compression feature of this disclosure is a key feature for HPM antenna designs that must fit on spatially-constrained platforms.

Another discriminating feature of employing an axisymmetric-mode feed in this disclosure is that the radiated electromagnetic (EM) field distribution, including and especially polarization, is azimuthally invariant. This invariance allows a subsequent steering reflector illuminated by the antenna system in this disclosure, to deflect the beam to any azimuthal direction with zero variation of the power density or polarization in the deflected beam at any azimuth, an ideal configuration for a beam-steered HPM antenna system. A high-purity $TE_{01}$ axisymmetric mode radiated by the feed may be implemented as described below.

Referring now to FIG. 1, a system 100 is shown to include an axisymmetric Cassegrain reflector pair antenna 30 (hereinafter also referred to as Cassegrain antenna 30 or antenna 30) for radiating axisymmetric modes as to be described further herein with a high power magnetron (HPM) power source 10 and a waveguide combiner 20.

A known high power magnetron power source for radio frequency (RF) energy is described in U.S. Pat. No. 9,805,901 B2 issued on Oct. 31, 2017, having the same assignee as the present invention and incorporated herein by reference. As described therein, a magnetron assembly to provide a high power magnetron power source 10 includes a compact magnetic field generator for high-power magnetrons, a high-power magnetron (internal within the magnetron assembly), and multiple output waveguides. One or more wedge shaped output waveguides are coupled to a compact magnetic field generator. Each output waveguide fits between two annular wedge magnets, and each waveguide is mechanically coupled to an RF extraction waveguide or to a termination plate. In the present disclosure, the magnetron assembly includes two extraction waveguides 12.

The combiner 20 includes two input waveguides 22 and a circular waveguide 24 to provide an output having a $TE_{01}$ circular mode as described in more detail in patent application Ser. No. 16/891,637 filed on Jun. 3, 2020, having the same assignee as the present invention and incorporated herein by reference. Suffice it to say here, R.F. energy exiting extraction waveguides 12 follows the path defined by the waveguides 14, respectively. Each waveguide 14 branch away from a respective extraction waveguide 12 and connect to a respective input wave guide 22 (collectively referred to as waveguide 22) of the combiner 20. The duo-quad combiner 20 transforms the $TE_{10}$ rectangular mode of the two rectangular waveguides 22 into the $TE_{01}$ circular mode propagating in a single waveguide 24 which feeds a flare horn 36 for a feed for the antenna 30.

Figure 2:
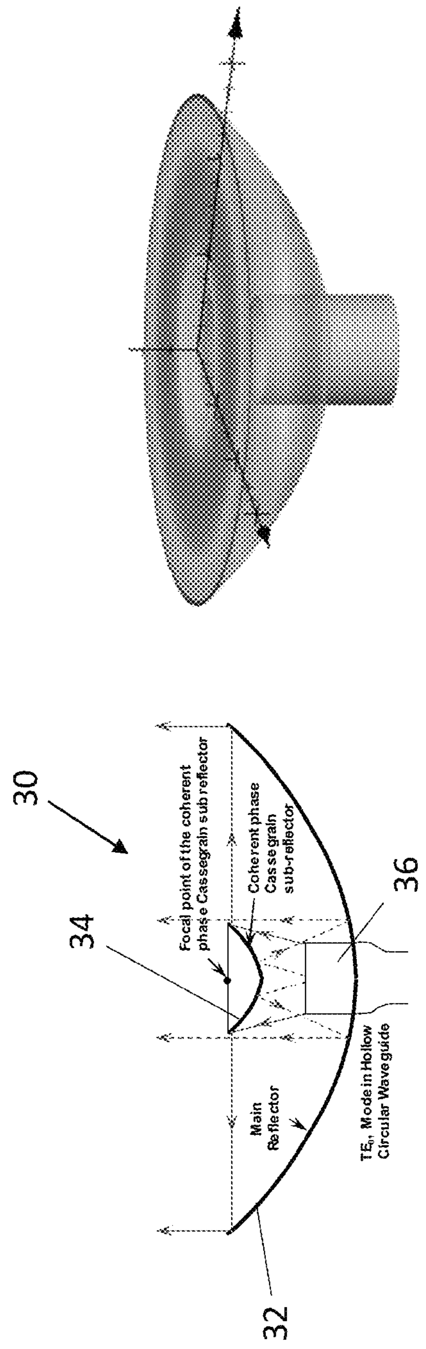
FIG. 2 shows an axisymmetric Cassegrain reflector pair antenna for radiating axisymmetric modes.

Referring now also to FIG. 2, a schematic layout of an embodiment of an axisymmetric Cassegrain reflector pair antenna 30 radiating the TE axisymmetric mode is shown in the left side of FIG. 2. Dotted lines with arrowheads show inner extreme rays. Solid lines with arrowheads show outer extreme rays. Ideally, almost all radiation propagates between these geometrical extremes. Aperture fields in the $TE_{01}$ circular waveguide mode radiate from an open hollow circular waveguide feed 36 that has been flared to the system-optimized design radius. The radiated axisymmetric fields reflect from the coherent-phase sub-reflector to the main reflector. The sub-reflector is a body-of-revolution (BoR) coherent-phase surface; coherent phase relative to the near focal point of the focusing reflector on the symmetry axis. Coherent-phase design is necessary in the sub-reflector because the non-spherical phase front radiated by the $TE_{01}$ circular waveguide feed precludes constructing the sub-reflector as a hyperboloidal conic section, as is often prescribed for an typical Cassegrain reflector illuminated by a feed with a single center of phase and a cosine or quasi-Gaussian modal field distribution. With coherent-phase design in the sub reflector, the phase front of fields reflected from the sub reflector is very nearly spherical; as if the reflected fields radiate from a point source; allowing the main reflector to adopt the shape of a conic section with the sub focal point serving as one of two focal points defining the conic section shape of the main reflector. Both elliptical (second focal point of the main reflector at a finite distance) and parabolic (second focal point of the main reflector at infinity) curves are considered for the BoR main reflector in design optimization, with final selection determined by performance figures of merit through EM simulation. The right side of FIG. 2 shows the large annular region of significant illumination of the aperture with excellent tapering toward the outer edge. FIG. 2 shows on the left a schematic rendering of a TE axisymmetric Cassegrain reflector and on the right a surface-normal power density illumination of the sub and main reflectors and the aperture plane.

Figure 3:
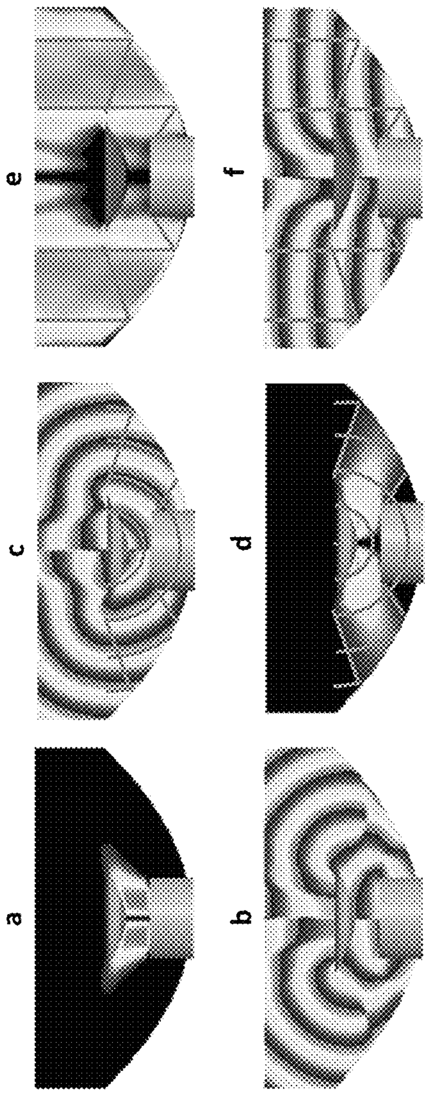
FIG. 3 visualizes wave interactions in the volume between the horn, sub-reflector, main reflector, and aperture plane.

FIG. 3 visualizes wave interactions in the volume between the feed, sub-reflector, main reflector, and aperture plane. Plots 3*a* and 3*b* show the Poynting power density and phase of the horn illuminating the sub reflector. The null on the symmetry axis is apparent. The phase plot reveals that the sub reflector to feed offset in this embodiment is approximately one wavelength, which would be absurdly close for a typical Cassegrain reflector system. Plots 3*c* and 3*d* show the Poynting power density and phase of radiation reflected from the sub reflector. The circular overlaid lines show how spherical the reflected wave is in the bracketed regions of significant power density. Plots 3*e* and 3*f* show the Poynting power density and phase of radiation reflected from the main reflector. The lines overlaid on the plots reveal the coherent phase and flatness of the phase in the bracketed regions of significant power density. FIG. 3 shows visualizations of the power density and azimuthal E-field phase revealing the electrodynamics of radiated waves radiated from the waveguide through this embodiment of an $TE_{01}$ mode feed illuminated axisymmetric Cassegrain reflector antenna system, radiating the axisymmetric reflector aperture mode.

Figure 4:
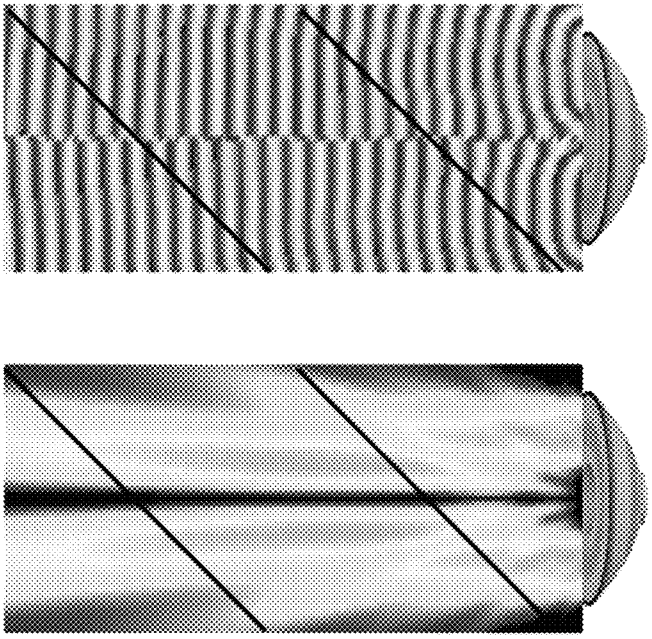
FIG. 4 visualizes radiation propagating beyond the aperture of this same embodiment of the TE axisymmetric Cassegrain reflector.

Altogether, the plots of FIG. 3 demonstrate that although this Axisymmetric Cassegrain Reflector Radiating a TE Axisymmetric Mode is electrically small; only about nine wavelengths in diameter and about two wavelengths high, it is capable of forming a substantial beam. FIG. 4 visualizes radiation propagating beyond the aperture of this same embodiment of the TE axisymmetric Cassegrain reflector. Angled black lines overlaid on the plots locate the approximate positions of an azimuthal steering reflector (near the aperture) and a possible polar steering reflector (further distance from the aperture). Salient features to note are 1) most of the RF power radiated by the TE axisymmetric Cassegrain reflector will be intercepted by steering reflectors, and 2) the axisymmetric phase fronts radiated by the embodiment remain nearly planar even to the extreme end of the second steering reflector. It should now be appreciated FIG. 4 shows power density on and radiation beyond the aperture of the embodiment of an axisymmetric Cassegrain reflector radiating a $TE_{01}$ axisymmetric mode.

Figure 5:
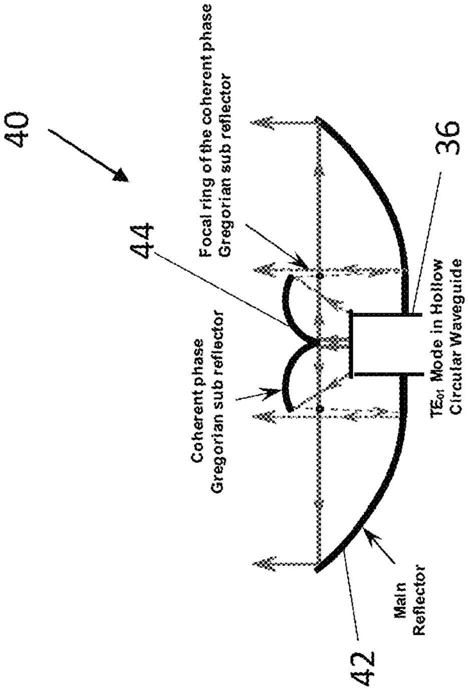
FIG. 5 shows an Axisymmetric Gregorian Reflector Pair for Radiating Axisymmetric Modes according to the disclosure.

Referring now to FIG. 5, an Axisymmetric Gregorian Reflector Pair for Radiating Axisymmetric Modes is shown. This disclosure relates to methods and apparatus for an axisymmetric Gregorian pair of reflectors composed of 1) a $TE_{01}$ or $TM_{01}$ mode feed-illuminated concave sub reflector that in turn illuminates 2) a larger concave main reflector. The assembly transforms a feed-radiated $TE_{01}$ circular or $TM_{01}$ circular axisymmetric waveguide mode into a collimated beam from the concave main reflector that retains the axisymmetric character of the feed modes in the main reflector aperture distribution. The reflecting surface of the sub reflector is shaped by design to render a phase coherent illumination of the main reflector with a collocated focal point for the sub reflector and main reflector. The disclosure can handle extremely high power, making it suitable for high-power microwave (HPM) applications.

In an ordinary axisymmetric (i.e., not offset) Gregorian reflector, an elliptically-polarized feed, here a horn, (linear or circular polarization) radiates a cosine or quasi-Gaussian electromagnetic (EM) aperture field distribution with maximum power density on the symmetry axis. This sub reflector illuminating field distribution with the maximum on symmetry axis, results in a significant portion of the radiated power being reflected from the sub reflector back into the feed, resulting in challenging return loss performance of the antenna system. This becomes especially challenging when the antenna system is employed in a high power application and/or when mechanical constraints require a crowded feed-sub-reflector topology.

In contrast, an axisymmetric Gregorian reflector antenna system utilizing a feed radiating TE or TM axisymmetric modes has a power density null on the symmetry axis, with the power-density distribution forming an annulus around the symmetry axis that has a maximum at a cylindrical radius removed from the symmetry axis. However, the power-density distribution decreases monotonically with radius beyond the maximum. This annular modal power distribution results in the sub reflector reflecting less power back into the feed, as compared to the typical cosine or quasi-Gaussian type distributions. The reflected power is distributed radially outward to larger polar angles. On the aperture of the main reflector the power-density distribution as illuminated by the sub reflector forms a broad annulus covering most of the area of the aperture and tapering more rapidly than a cosine or quasi-Gaussian type distribution, rendering lower than typical edge illumination of the main reflector.

The null on the symmetry axis radiated by an axisymmetric-mode feed allows the Gregorian sub reflector to crowd very close to the feed without imposing significant return loss, thereby substantially reducing the minimum axial length of the Gregorian reflector antenna system fed by a cosine or quasi-Gaussian distribution mode feed. This allows crowding of the feed to sub reflector, resulting in better compact topology options. The enabled axial size compression feature of this disclosure is a key feature for HPM antenna designs that must fit on spatially-constrained platforms.

Another discriminating feature of axisymmetric-mode feed in this disclosure is that the radiated electromagnetic (EM) field distribution, including and especially polarization, is azimuthally invariant. This invariance allows a subsequent steering reflector to deflect the beam to any azimuthal direction with zero variation of the power density or polarization in the deflected beam at any azimuth, an ideal configuration for a beam-steered HPM antenna system. A high-purity $TE_{01}$ axisymmetric mode radiated by the feed horn may be implemented using the techniques described above. To rectify the axisymmetric EM field distribution so that the steered beam propagates as a Gaussian beam with high directivity, this disclosure anticipates the downstream antenna component disclosed hereinbelow, and contributes to the ensemble system as described herein and can be implemented as an alternative embodiment.

Figure 5A:
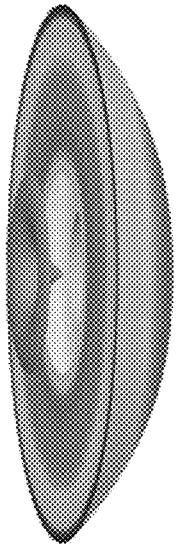
FIG. 5A shows surface-normal power density illumination of the sub and main reflectors and the aperture plane.

The schematic layout of an embodiment of an Axisymmetric Gregorian Reflector Radiating the TE Axisymmetric Mode is shown in FIG. 5. Dotted lines with arrowheads show inner extreme rays. Solid lines with arrowheads show outer extreme rays. Ideally, almost all radiation propagates between these geometrical extremes. Aperture fields in the $TE_{01}$ circular waveguide mode radiate from an open hollow circular waveguide feed that has been flared to the system-optimized design radius. The radiated axisymmetric fields reflect from the coherent-phase sub-reflector to the main reflector. The sub-reflector is a body-of-revolution (BoR) coherent-phase surface; coherent phase relative to the near focal point of the focusing reflector on the symmetry axis. Coherent phase design is necessary in the sub-reflector because the non-spherical phase front radiated by the $TE_{01}$ circular waveguide horn precludes constructing the sub-reflector as a hyperboloidal conic section, as is often prescribed for an ordinary Gregorian reflector illuminated by a horn with a single center of phase. With coherent-phase design in the sub reflector, the phase front of fields reflected from the sub reflector is very nearly spherical, as if the reflected fields radiate from a point source, allowing the main reflector to adopt the shape of a conic section with the sub focal point serving as one of two focal points defining the conic section shape of the main reflector. Both elliptical (second focal point of the main reflector at a finite distance) and parabolic (second focal point of the main reflector at infinity) curves are considered for the BoR main reflector in design optimization, with final selection determined by performance figures of merit through EM simulation. FIG. 5A shows a large annular region of significant illumination of the aperture with excellent tapering toward the outer edge, implying that the aperture efficiency is reasonably high.

It should now be appreciated, FIG. 5 shows a schematic rendering of a TE axisymmetric Gregorian reflector, and FIG. 5A shows surface-normal power density illumination of the sub and main reflectors and the aperture plane.

Figure 6:
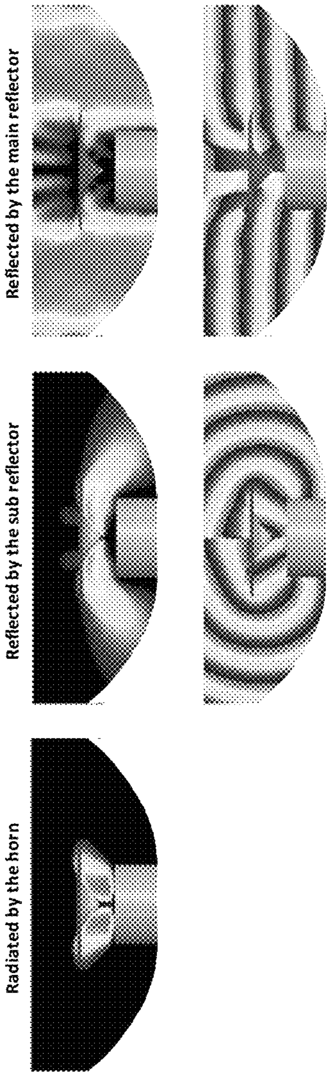
FIG. 6 visualizes wave interactions in the volume between the horn, sub-reflector, main reflector, and aperture plane.

FIG. 6 visualizes wave interactions in the volume between the horn, sub-reflector, main reflector, and aperture plane. The leftmost plot shows the Poynting power density of the $TE_{01}$ axisymmetric horn illuminating the sub reflector.

The null on the symmetry axis is apparent, allowing the lower tip of the sub reflector to be less than half a wavelength from the horn aperture, which would absurdly close for an ordinary Gregorian reflector. The center plots show the Poynting power density and phase of radiation reflected from the sub reflector, revealing 1) that the wavefront intercepting the main reflector is almost perfectly circular in any azimuthal cut (e.g., the plane of the plot) in the region of significant power density and 2) that very little power intercept the horn aperture, even in this extremely short axial length. The rightmost plots show the Poynting power density and phase of radiation reflected from the main reflector, revealing the local phase coherence and outstanding planarity of the phase fronts in in the bracketed regions of significant power density. It should now be appreciated, FIG. 6 shows visualizations of the power density and azimuthal E-field phase revealing the electrodynamics of radiated waves radiated from the waveguide through this embodiment of an Axisymmetric Gregorian Reflector Radiating the $TE_{01}$ Axisymmetric Mode.

Figure 7:
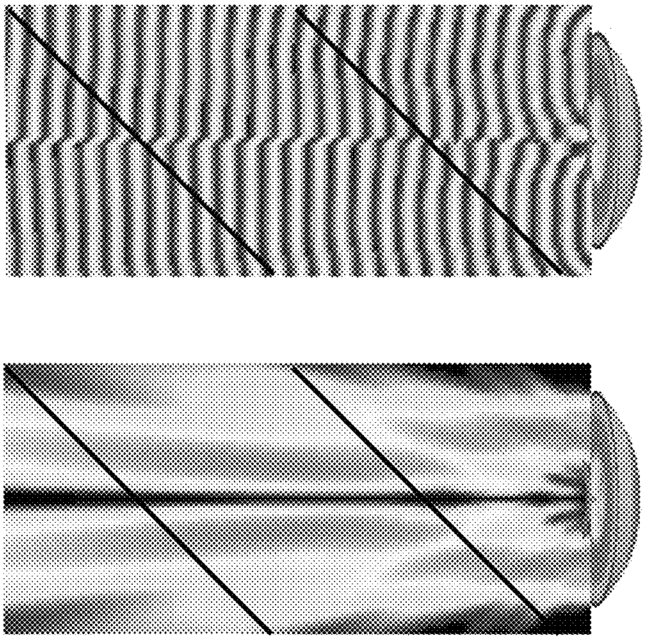
FIG. 7 shows power density on and radiation beyond the aperture of the embodiment an Axisymmetric Gregorian Reflector Radiating a $TE_{01}$ Axisymmetric Mode.

Altogether, the plots of FIG. 6 demonstrate that although this Axisymmetric Gregorian Reflector Radiating the TE Axisymmetric Mode is electrically small, only about nine wavelengths in diameter and about two wavelengths in axial length, it is capable of forming a substantial beam. FIG. 7 visualizes radiation propagating beyond the aperture of this same embodiment of the TE axisymmetric Gregorian reflector. Angled black lines overlaid on the plots locate the approximate positions of an azimuthal steering reflector (near the aperture) and a possible polar steering reflector (further distance from the aperture). Salient features to note are 1) most of the RF power radiated by the TE axisymmetric Gregorian reflector will be intercepted by steering reflectors, and 2) the axisymmetric phase fronts radiated by the embodiment remain nearly planar even to the extreme end of the second steering reflector. FIG. 7 shows power density on and radiation beyond the aperture of the embodiment an Axisymmetric Gregorian Reflector Radiating a $TE_{01}$ Axisymmetric Mode.

Figure 8:
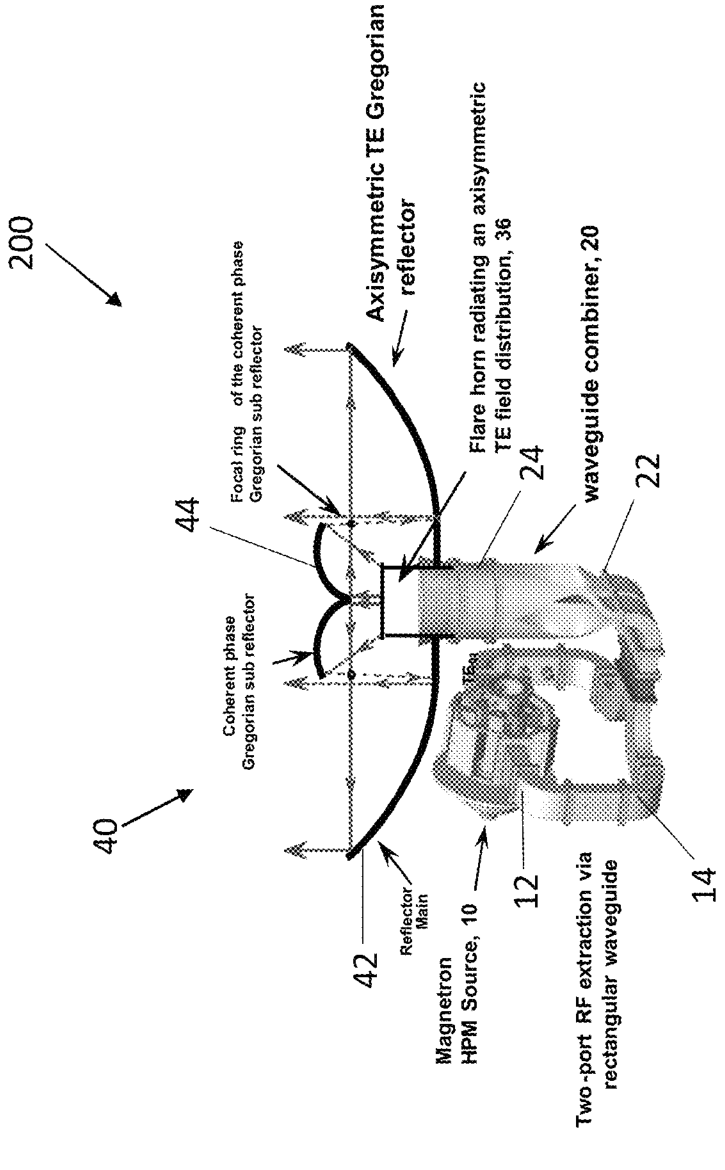
FIG. 8 shows a high power microwave system with an axisymmetric Gregorian reflector pair antenna.

Referring now to FIG. 8, a system 200 is shown to include an axisymmetric Gregorian reflector pair antenna 40 (hereinafter also referred to as Gregorian antenna 40 or antenna 40) for radiating axisymmetric modes with a high power magnetron (HPM) power source 10 and a waveguide combiner 20.

As described above, a known high power magnetron power source for radio frequency (RF) energy is described in U.S. Pat. No. 9,805,901 B2 issued on Oct. 31, 2017, having the same assignee as the present invention and incorporated herein by reference. As described therein, a magnetron assembly to provide a high power magnetron power source 10 includes a compact magnetic field generator for high-power magnetrons, a high-power magnetron (internal within the magnetron assembly), and multiple output waveguides. One or more wedge shaped output waveguides are coupled to a compact magnetic field generator. Each output waveguide fits between two annular wedge magnets, and each waveguide is mechanically coupled to an RF extraction waveguide or to a termination plate. In the present disclosure, the magnetron assembly includes two extraction waveguides 12.

The combiner 20 includes two input waveguides 22 and a circular waveguide 24 to provide an output having a $TE_{01}$ circular mode as described in more detail in patent application Ser. No. 16/891,637 filed on Jun. 3, 2020, having the same assignee as the present invention and incorporated herein by reference. Suffice it to say here, R.F. energy exiting extraction waveguides 12 follows the path defined by the waveguides 14, respectively. Each waveguide 14 branch away from a respective extraction waveguide 12 and connect to a respective input wave guide 22 (collectively referred to as waveguide 22) of the combiner 20. The duo-quad combiner 20 transforms the $TE_{10}$ rectangular mode of the two rectangular waveguides 22 into the $TE_{01}$ circular mode propagating in a single waveguide 24 which feeds a flare horn 36 for a feed for the antenna 40, here Gregorian antenna 40.

Having described preferred embodiments, it that other embodiments incorporating their concepts may be used. Elements of different embodiments described herein may be combined to form other embodiments not specifically set forth above. Various elements, which are described in the context of a single embodiment, may also be provided separately or in any suitable sub-combination. Other embodiments utilizing the elements, combinations and techniques of the claims set forth herein but not specifically described herein naturally may also fall within the scope of the following claims.

What is claimed is:

1. A reflector antenna system comprising:

a concave primary reflector, the concave primary reflector adapted to be illuminated by and radiate an axisymmetrical aperture distribution beam;

a coherent-phase sub-reflector disposed in front of the primary reflector, wherein the coherent-phase sub-reflector is disposed within one operational wavelength from the primary reflector; and a feed adapted to operate with an $TE_{01}$ axisymmetric mode and illuminating the said sub-reflector by employment of such, an aperture of the feed disposed to crowd the sub-reflector.

2. The reflector antenna system as recited in claim 1 wherein the sub-reflector comprises a Cassegrain sub-reflector.

3. The reflector antenna system as recited in claim 1 wherein the sub-reflector comprises a Gregorian sub-reflector.

4. The reflector antenna system as recited in claim 1 wherein the feed is adapted to provide a symmetry axis azimuthally invariant electromagnetic field distribution illumination of the sub-reflector.

5. The reflector antenna system as recited in claim 1 wherein the primary reflector is adapted to be illuminated by the sub-reflector and radiate accordingly a symmetry axis azimuthally invariant electromagnetic field distribution beam.

6. A method of providing a reflector antenna comprising:

concave primary reflector, the concave primary reflector adapted to be illuminated by and radiate an axisymmetrical aperture distribution beam;

providing a coherent-phase sub-reflector disposed in front of the primary reflector, wherein the coherent-phase sub-reflector is disposed within one operational wavelength from the primary reflector; and providing a feed adapted to operate with an $TE_{01}$ axisymmetric mode and illuminating the said sub-reflector by employment of such, an aperture of the feed disposed to crowd the sub-reflector.

7. The method as recited in claim 6 wherein the sub-reflector comprises a Cassegrain sub-reflector.

8. The method as recited in claim 6 wherein the sub-reflector comprises a Gregorian sub-reflector.

9. The method as recited in claim 6 wherein the feed is adapted to provide a symmetry axis azimuthally invariant electromagnetic field distribution illumination of the sub-reflector.

10. The method as recited in claim 6 wherein the primary reflector is adapted to be illuminated by the sub-reflector and radiate accordingly a symmetry axis azimuthally invariant electromagnetic field distribution beam.

11. A reflector antenna system comprising:

a concave primary reflector, the concave primary reflector adapted to be illuminated by and radiate an axisymmetrical aperture distribution beam;

a coherent-phase sub-reflector disposed in front of the primary reflector, wherein the coherent-phase sub-reflector is disposed within a half of an operational wavelength from the primary reflector; and a feed adapted to operate with an $TE_{01}$ axisymmetric mode and illuminating the said sub-reflector by employment of such, an aperture of the feed disposed to crowd the sub-reflector.

12. A method of providing a reflector antenna comprising:

concave primary reflector, the concave primary reflector adapted to be illuminated by and radiate an axisymmetrical aperture distribution beam;

providing a coherent-phase sub-reflector disposed in front of the primary reflector, wherein the coherent-phase sub-reflector is disposed within a half of an operational wavelength from the primary reflector; and providing a feed adapted to operate with an $TE_{01}$ axisymmetric mode and illuminating the said sub-reflector by employment of such, an aperture of the feed disposed to crowd the sub-reflector.

* * * * *